(12) United States Patent
Rees et al.

(10) Patent No.: US 6,419,118 B1
(45) Date of Patent: Jul. 16, 2002

(54) CONTAINERS WITH FLEXIBLE POUCH AND CLOSURE MEMBER

(76) Inventors: Blake M. Rees, 1326 Barnes Rd., Leslie, MI (US) 49251; Janice DeWeese, 307 Dart La., Fenton, MO (US) 63026; Benjamin McGregor Rees, 3208 Holiday, Apt. 28, Lansing, MI (US) 48912

( * ) Notice: Subject to any disclaimer, the term of this patent is extended or adjusted under 35 U.S.C. 154(b) by 0 days.

(21) Appl. No.: 09/614,159

(22) Filed: Jul. 11, 2000

(51) Int. Cl.[7] ................................................ B65D 35/00
(52) U.S. Cl. ........................ 222/94; 222/1; 222/105; 239/10; 239/310; 239/328; 137/564.5; 383/904; 383/906
(58) Field of Search ................................ 222/94.1, 105; 239/10, 310, 328; 137/564.5; 383/41, 904, 906

(56) References Cited

U.S. PATENT DOCUMENTS

| | | | |
|---|---|---|---|
| 2,302,799 A | * 11/1942 | Peterson | 239/310 |
| 3,165,114 A | * 1/1965 | Garrett | 383/904 |
| 3,174,691 A | 3/1965 | Haviland | |
| 3,201,047 A | 8/1965 | Danberg | |
| 3,255,972 A | 6/1966 | Hultgren et al. | |
| 3,259,321 A | 7/1966 | Sellers et al. | |
| 3,432,104 A | 3/1969 | Kaltenbach | |
| 3,556,141 A | 1/1971 | Hind | |
| 3,720,230 A | 3/1973 | Miller et al. | 137/564.5 |
| 4,322,020 A | 3/1982 | Stone | |
| 4,635,848 A | 1/1987 | Little | |
| 4,718,778 A | 1/1988 | Ichikawa | 383/100 |
| 4,732,299 A | 3/1988 | Hoyt | 222/94 |
| 4,776,488 A | 10/1988 | Gurzan | |
| 4,974,634 A | * 12/1990 | Aguila | 137/564.5 |
| 5,143,294 A | 9/1992 | Lintvedt | |
| 5,499,750 A | 3/1996 | Manifold | |
| 5,511,697 A | 4/1996 | Gruenbacher et al. | |
| 5,540,358 A | 7/1996 | Wiles et al. | |
| 5,647,511 A | 7/1997 | Bond | |
| 5,678,732 A | 10/1997 | Gianpaolo | 222/107 |
| D396,630 S | 8/1998 | Lerner | |
| 5,954,230 A | * 9/1999 | Blette et al. | 222/1 |
| 5,971,613 A | * 10/1999 | Bell | 383/906 |

FOREIGN PATENT DOCUMENTS

EP 564208 * 10/1993 ............ 222/94

* cited by examiner

Primary Examiner—J. Casimer Jacyna
(74) Attorney, Agent, or Firm—Ian C. McLeod

(57) ABSTRACT

Containers including a flexible pouches (12, 22, 33, 42, 52, 63, 73, 83) with a unique fitments (11, 21, 31, 41, 51, 61, 71, 81) with tapered portions (11C, 11D, 21C, 21D, 31C, 41C, 41D, 51C, 51D, 61E, 71E, 82A, 82B) are described. The containers are used for liquids and solids to be dispensed.

23 Claims, 11 Drawing Sheets

CONTAINERS WITH FLEXIBLE POUCH AND CLOSURE MEMBER

GOVERNMENT FUNDING

None

CROSS REFERENCE TO RELATED APPLICATION

None

BACKGROUND OF THE INVENTION

1. Field of Invention

The present invention relates to containers with a flexible pouch and a closure fitment or member for the pouch. In particular, the present invention relates to a unique type of fitment for flexible pouches.

2. Description of Related Art

Numerous prior art patents show flexible or collapsible containers for holding various liquid or solid materials which are dispersed from an opening in the container. Illustrative are U.S. Pat. No. 3,174,691 to Haviland; U.S. Pat. No. 3,201,047 to Danberg; U.S. Pat. No. 3,255,972 to Hultqren et al; U.S. Pat. No. 3,259,321 to Sellers et al; U.S. Pat. No. 3,432,104 to Kaltenbach; U.S. Pat. No. 3,556,141 to Hind; U.S. Pat. No. 3,720,230 to Miller et al; U.S. Pat. No. 4,322,020 to Stone; U.S. Pat. No. 4,635,848 to Little; U.S. Pat. No. 4,718,778 to Ichikawa; U.S. Pat. No. 4,732,299 to Hoyt; U.S. Pat. No. 4,776,488 to Gurzan; U.S. Pat. No. 5,143,294 to Lintvedt; U.S. Pat. No. 5,499,750 to Manifold; U.S. Pat. No. 5,511,697 to Gruenbacher et al; U.S. Pat. No. 5,540,358 to Wiles et al; U.S. Pat. No. 5,647,511 to Bond; U.S. Pat. No. 5,678,732 to Gianpaolo and Des. U.S. Pat. No. 396,630 to Lerner.

The recurring problem is that the seals between a fitment for dispensing the material and the flexible container or pouch are susceptible to flex cracking or the fitment is expensive to fabricate. Sometimes the fitments are difficult for persons with arthritic hands to use.

OBJECTS

It is therefore an object of the present invention to provide a container with a fitment attached to a flexible pouch in a manner to provide a rigid head seal. It is also an object of the present invention to provide a method for the use of the container. Further, it is an object of the present invention to provide a method for easily assembling the containers. Further still, it is an object of the present invention to provide a container and method of fabrication which is very convenient and cost effective. These and other objects will become increasingly apparent by reference to the following description and the drawings.

SUMMARY OF THE INVENTION

The present invention relates to a container comprising a pouch with opposed flat portions at an opening and comprised of a flexible pliable material; a closure fitment sealingly mounted inside of the opening of the pouch on the opposed flat portions of the pouch, wherein the closure fitment has opposed elongate tapered surfaces which lead to an elongate edge with at least one opening between the tapered surfaces to the elongate edge and wherein the pouch is sealably mounted on the elongate tapered surfaces of the closure fitment, wherein the fitment provides structural stability for the pouch.

Also, the present invention relates to a method for dispensing a material from a container which comprises providing a container containing the material to be dispensed comprising a pouch with opposed flat portions at an opening and comprised of a flexible pliable material; a closure fitment sealingly mounted inside of the opening of the pouch on the opposed flat portions of the pouch, wherein the closure fitment has opposed elongate tapered surfaces which lead to an elongate edge with at least one opening between the tapered surfaces to the elongate edge and wherein the pouch is sealably mounted on the elongate tapered surfaces of the closure fitment; opening the closure fitment into the pouch; and dispensing the material out of the pouch and through the fitment from the container.

Finally, the present invention relates to a method for forming a container, comprising providing as separate parts a pouch having sides and opposed flat portions of a sheet material, wherein the pouch is provided with an opening; and a closure fitment which has opposed elongate tapered surfaces which provide an elongate edge where the pouch is sealably mounted to the closure fitment, which comprises: inserting the tapered surfaces of the closure member of the fitment on the inside of the pouch at the opening; and sealing the tapered surfaces to the pouch inside the opening to form the container.

DESCRIPTION OF PREFERRED EMBODIMENTS

In the following description the preferred mode of sealing the bag is by forming a heat seal on the fitment. an adhesive seal can be used as is well known to those skilled in the art. The pouches can be blown, molded, heat or adhesive sealed or otherwise formed in a manner well known to those skilled in the art. All such variations are encompassed by the present invention.

The pouches can be formed of any suitable flexible material, particularly plastics. The same is true of the fitments, which are relatively rigid compared to the pouches. All of these variations are encompassed by the present invention.

Figure 1:
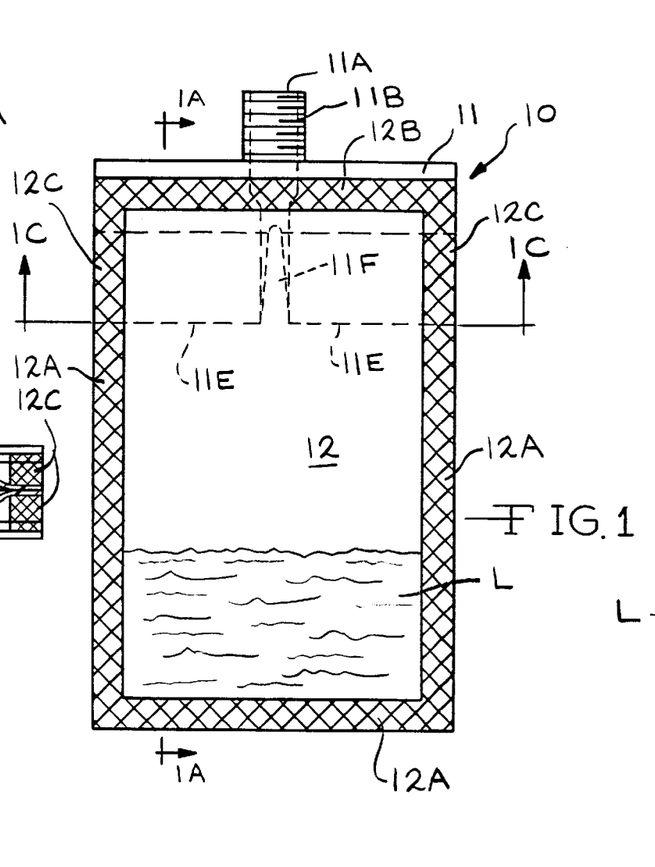
FIG. 1 is a front view of a container 10 of the present invention particularly illustrating the elongate tapered closure fitment 11 adapted for a threaded closure, particularly by cap 13, for a pouch or bag 12.
Figure 1A:
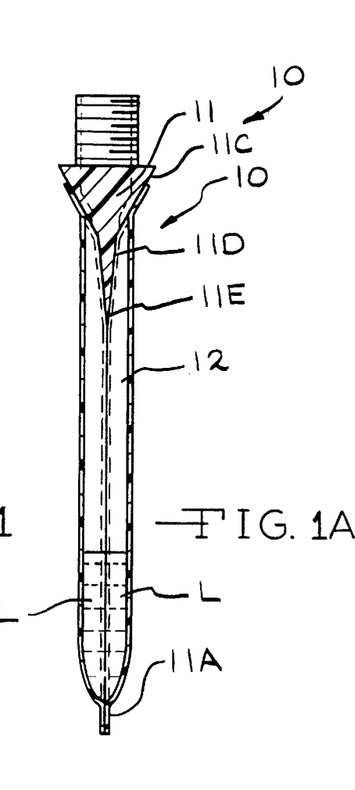
FIG. 1A is a side cross-sectional view along line 1A—1A of FIG. 1.
Figure 1B:
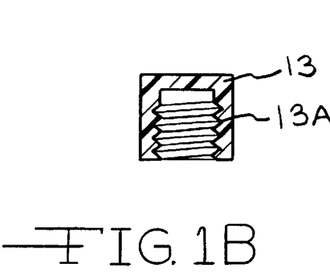
FIG. 1B is a front view of cap 13.
Figure 1C:
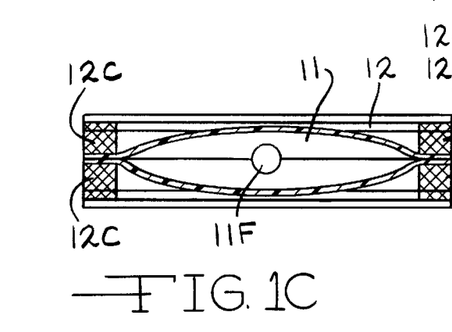
FIG. 1C is a side cross-sectional view along line 1C—1C of FIG. 1.

FIGS. 1A, 1B and 1C illustrate a container 10 with an elongate tapered fitment 11 with a threaded spout 11A for closing a bag or pouch 12. The spout 11A is closed by cap 13 with threads 13A which mate with threads 11B on spout 11A. As can be seen in FIG. 1B the fitment 11 has two tapers 11C and 11D leading to an edge 11E which is preferably rounded along its length as shown in FIG. 1. The pouch 12 is formed with heat seals 12A between two sheets of a thermoplastic material and also with heat seals 12B on fitment 11 on the tapered portion 11C and seals 12C on both of the tapered portions 11C and 11D. The fitment 11 is provided with an opening 11F which goes through the spout 11A. In use the package is filled with a liquid L and then the cap 13 is threaded onto the spout 11A. The cap 13 is removed from spout 11A to dispense the liquid L through the spout by squeezing the pouch 12 or by pouring. The container 10 provides a positive seal between the pouch 12 and the fitment 11.

Figures 2, 2A, 2B:
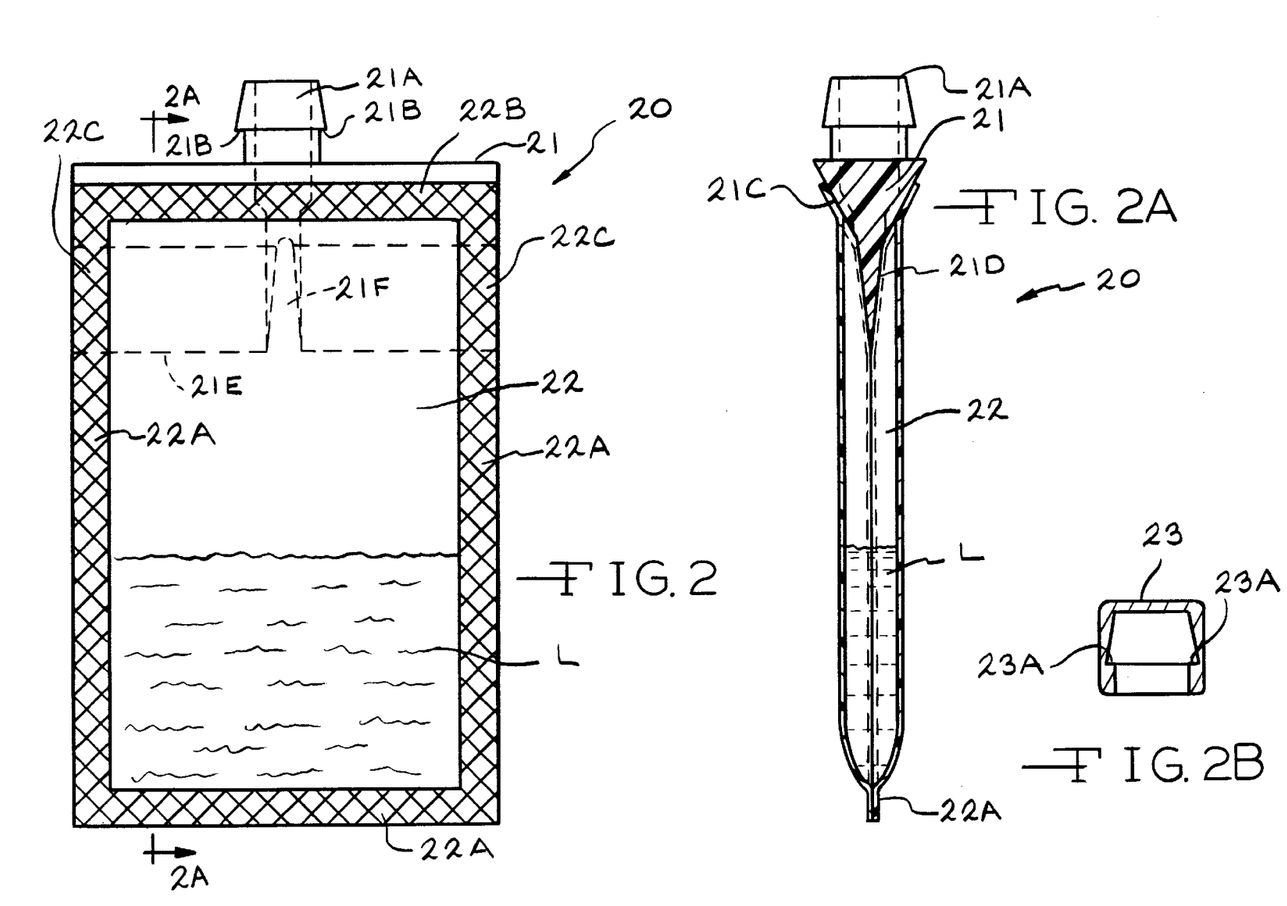
FIG. 2 is a front view of a container 20 of the present invention particularly illustrating the elongate tapered fitment 21 adapted for snap closure using a bayonet by cap 23 for closing the pouch or bag 22.
FIG. 2A is a side cross-sectional view along line 2A—2A of FIG. 2.
FIG. 2B is a cross-sectional view of a cap 23.

FIGS. 2, 2A and 2B show a container 20 with fitment 21 and pouch 22 similar to that of FIG. 1. The corresponding parts are labeled similarly to FIGS. 1, 1A, 1B and 1C. The difference is that fitment 21 has a spout 21A which is adapted for a snap or bayonet locking closure with cap 23. A ridge 21B is used in place of threads and mates with ridge 23A in cap 23. The fitment has two tapers 21C and 21D leading to edge 21E and an opening 21F. The pouch 22 has heat seals 22A, 22B, 22C. In use liquid L is dispensed through spout 21A.

Figures 3, 3A, 3E:
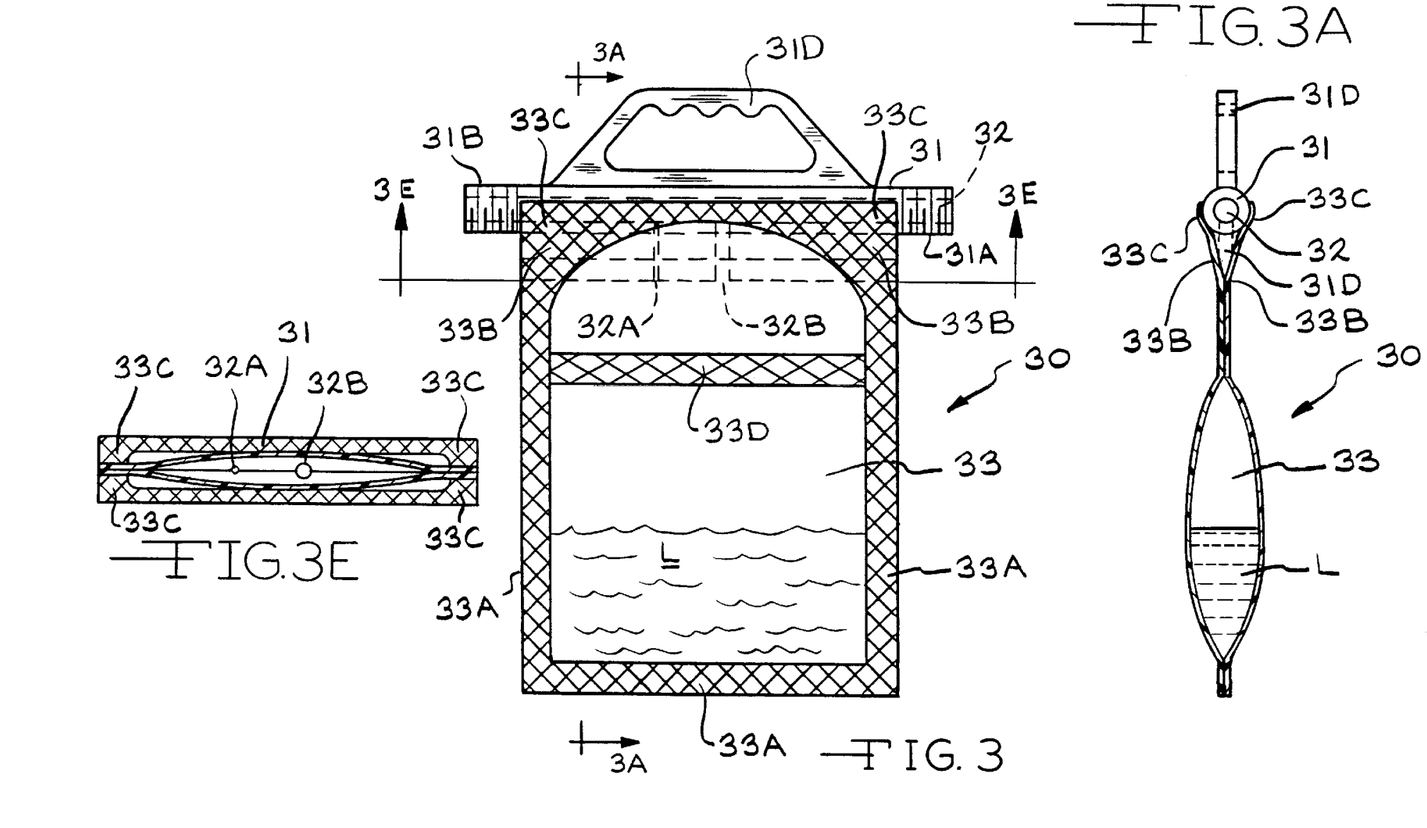
FIG. 3 is a front view of a container 30 of the present invention with a fitment 31 which allows fluid flow through passages 32, 32A and 32B.
FIG. 3A is a side cross-sectional view along line 3A—3A of FIG. 3.
FIG. 3E is a cross-sectional view along line 3E—3E of FIG. 3.
Figure 3B:
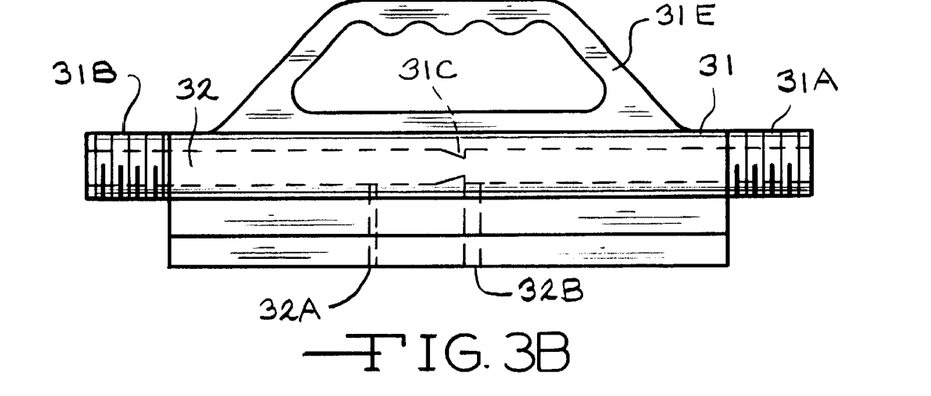
FIG. 3B is a front view of the fitment 31 alone.
Figure 3C:
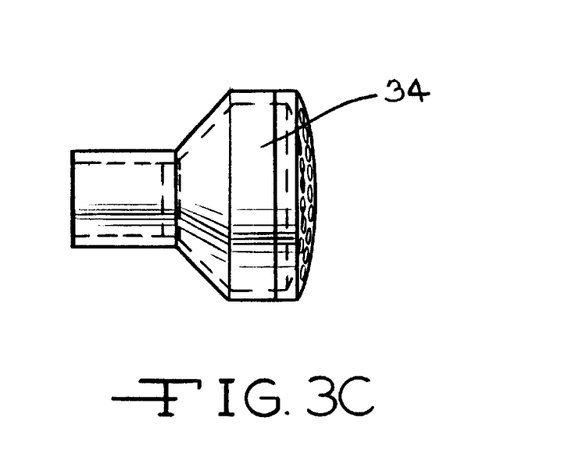
FIG. 3C is a front view of a nozzle 34 for threaded engagement with one end on threads 31A or 31B of the fitment 31.
Figure 3D:
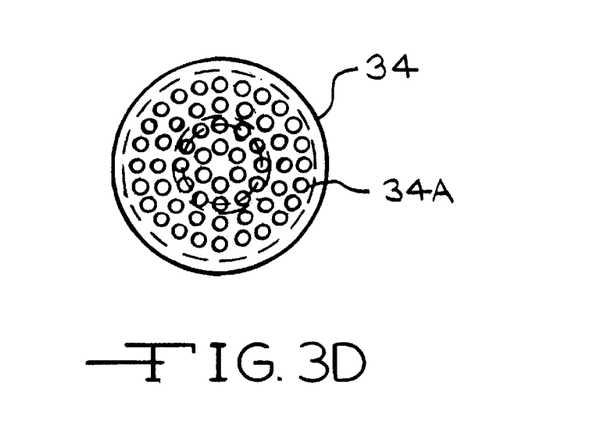
FIG. 3D is a right end view of the nozzle 34 of FIG. 3C.

FIGS. 3, 3A, 3B, 3C, 3D and 3E show another type of container 30 and parts with fitment 31 and pouch 33. The fitment 31 is provided with a central opening 32 along its length with threaded ends 31A and 31B. A nozzle 34 as shown in FIGS. 3C and 3D with openings 34A for providing a spray is mounted at one end 31A or 31B. The nozzle can be integral with the fitment 31 (not shown). There can also be a spray deflector (not shown). The fitment 31 is provided with a constriction 31C in opening 32 as shown in dotted lines in FIG. 3B and lateral openings 32A and 32B leading into an inside portion of the pouch 33. The pouch is provided with heat seals 33A to form the pouch 33, seals 33B on tapered portion 31D of the fitment 31, and heat seals 33C on tapered portion 31D of the fitment 31. A frangible seal 33D is formed in the pouch 33 by forming a heat seal at a lower temperature. This allows liquid L to be dispensed from the pouch 33 upon rupture of the frangible seal 33D, without affecting any of the other seals 33A, 33B or 33C. The fitment 31 is provided with an integral handle 31E for carrying. In use, one of the threads 31A or 31B is mounted on a garden hose or other source of supply of liquid or gas (not shown). The nozzle 34 is threaded onto the other threaded end 31A or 31B. The seal 33D is ruptured and then water flows into the pouch 33 through opening 32A to mix with liquid L (or a powder) and the level rises to opening 32B. The relative sizes of the openings 32A and 323 and constriction 31C cause the liquid L to be aspirated out of the openings 34A in nozzle 34 providing a spray for pesticides or herbicides for instance. The resulting container 30 is inexpensive to construct and very reliable.

FIGS. 4, 4A, 4B, 4C and FIG. 4D show a different type of container 40 which is designed to stand by itself on a surface having an integral support. The container 40 is provided with a fitment 41 and a pouch 42 and a standard hand operated fluid pump 43. The fitment 41 is similar to that shown in FIGS. 1 and 2 and includes tapers 41C and 41D leading to edge 41E. The pouch 42 has heat seals 42A, 42B, 42C and 42D. A tube 44 providing the support for the pouch 42 with a flared bottom 44A with openings 44B (FIG. 4D) extends to a bottom portion 42E of pouch 42. The bottom 42F is a solid sheet of material and supports flared portion 44A on tube 44. The result is that the container 40 stands on its own and is suitable for use of the pump 43 by pressing the pump 43 down in a conventional manner.

Figures 4, 4A, 4B, 4C, 4D:
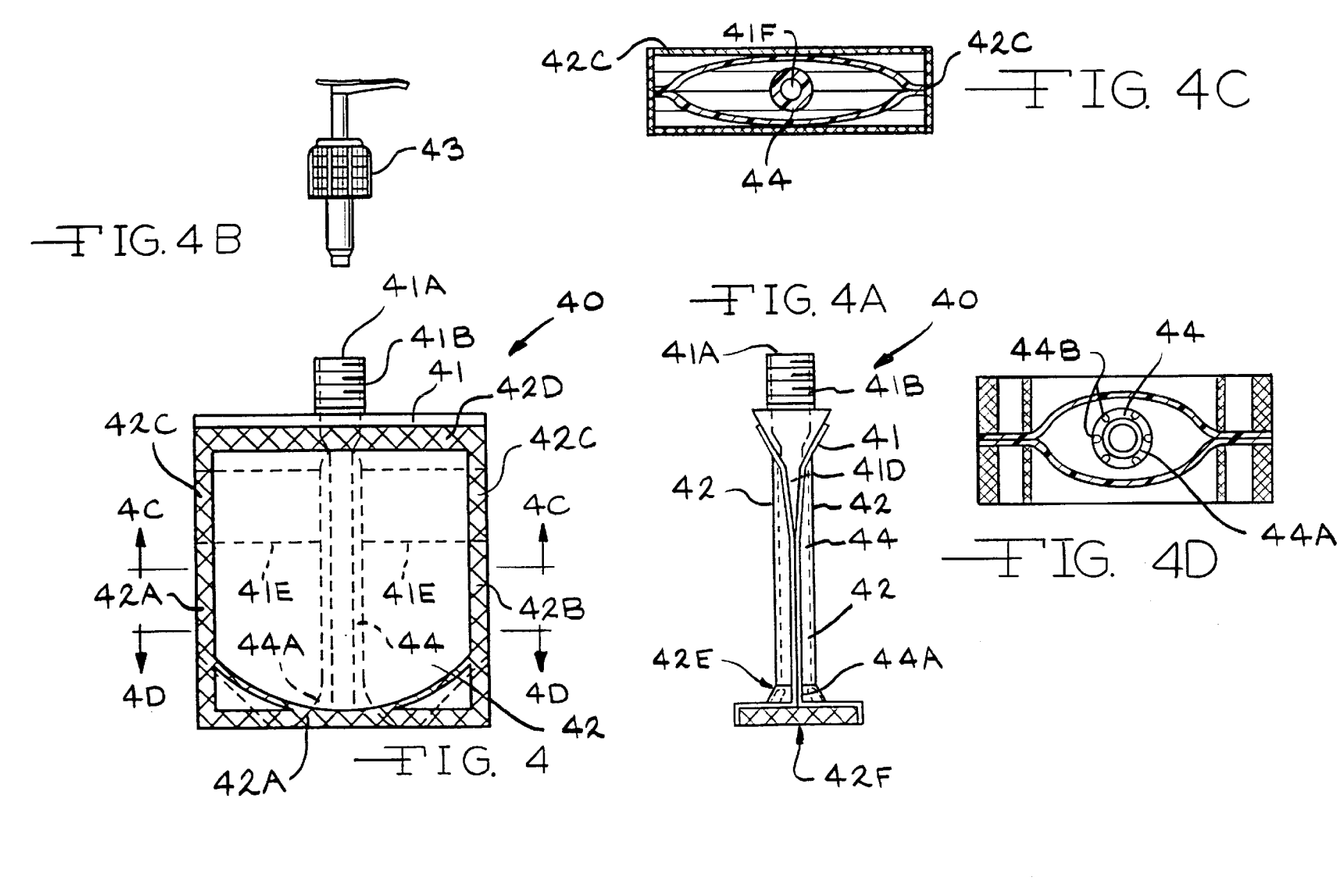
FIG. 4 is a front view of a container 40 with a fitment 41 and a pouch 42 with a pump 43 and a stand up support frame.
FIG. 4A is a side cross-sectional view along line 4A—4A of FIG. 4.
FIG. 4B is a front view of a pump 43.
FIG. 4C is a cross-sectional view along line 4C—4C of FIG. 1.
FIG. 4D is a cross-sectional view along line 4D—4D of FIG. 1.
Figures 5, 5A, 5B, 5C:
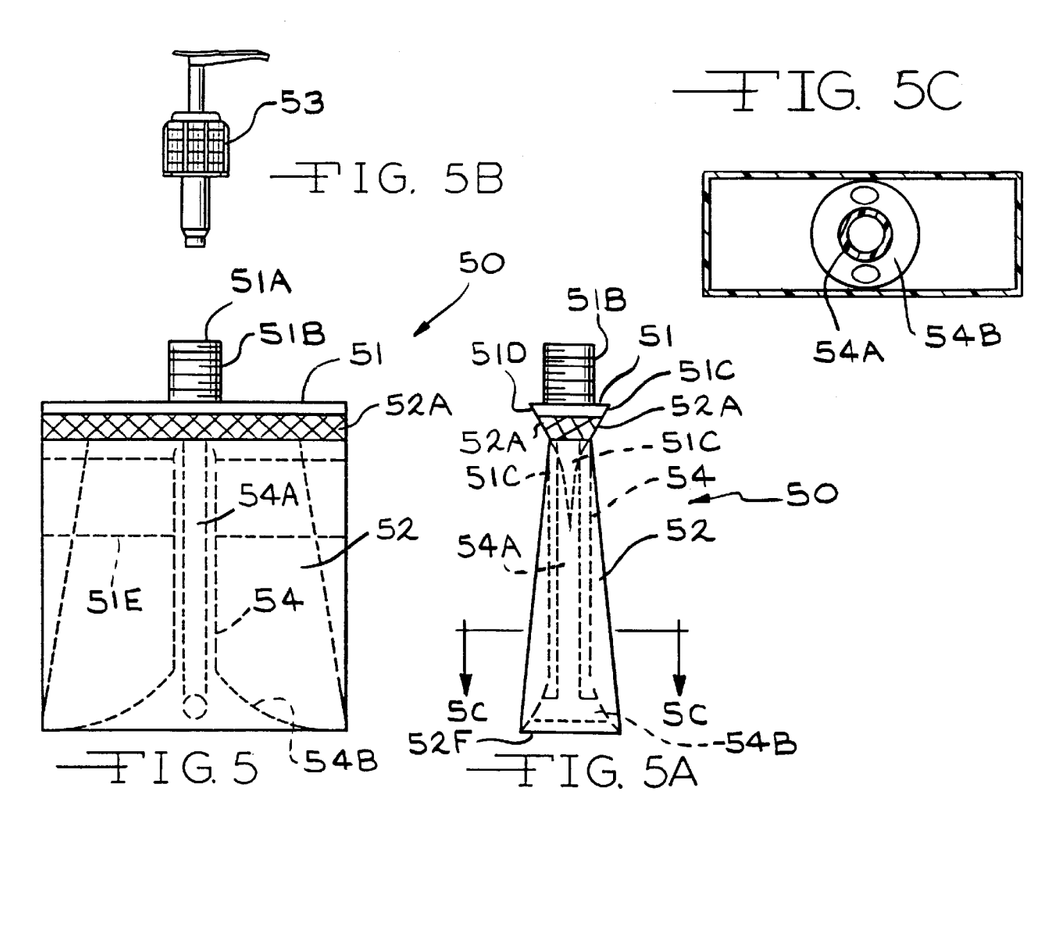
FIG. 5 is a front view of a container 50 with a fitment 51 and a pouch 52 with a pump 43 and a stand up support frame.
FIG. 5A is a side cross-sectional view along line 5A—5A of FIG. 5.
FIG. 5B is a front view of a hand pump 53.
FIG. 5C is a cross-sectional view along line 5C—5C of FIG. 5A.

FIGS. 5, 5A, 5B and 5C are similar to FIG. 4 with container 50, fitment 51, spout 51A with threads 51B, pouch 52 and pump 53. The pouch has seals 52A around the opening of the pouch 52 on fitment 51 which pouch 52 is formed as an integral bag by blowing a film or the like. The fitment 51 includes tapers 51C and 51D leading to edge 51E. The opening 54A is surrounded by tube 54 leading to a flared bottom 54B. The bottom 52F is a solid sheet of material and supports flared bottom 54B.

Figure 6:
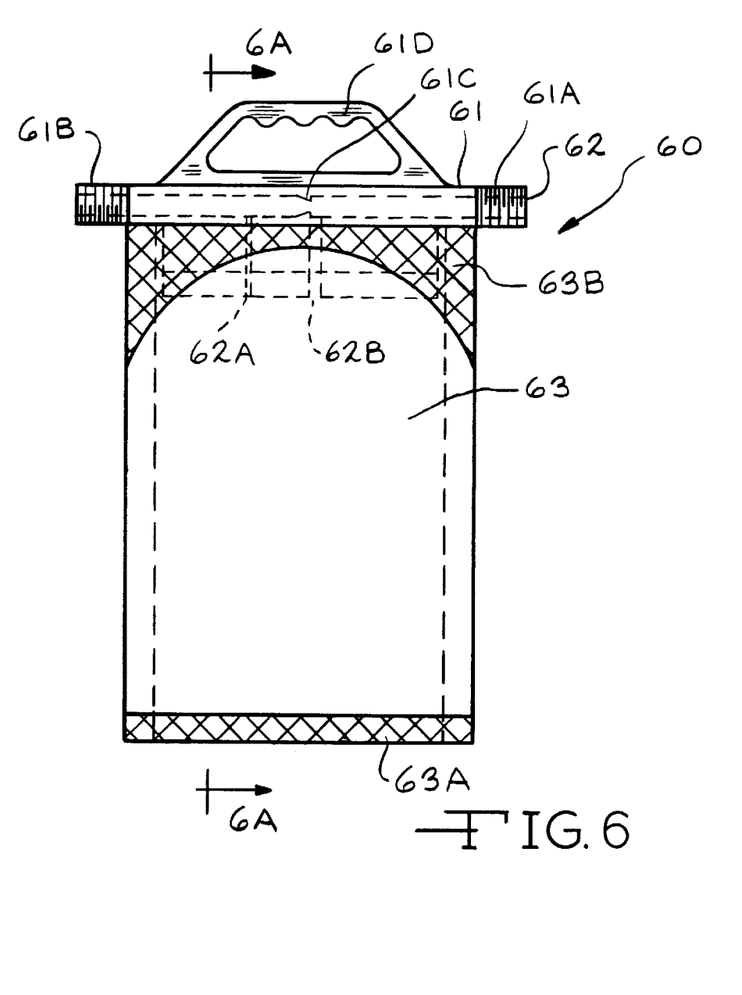
FIG. 6 is a front view of a container 60 with a fitment 61, similar to that shown in FIG. 3B, along with a pouch 63.
Figure 6A:
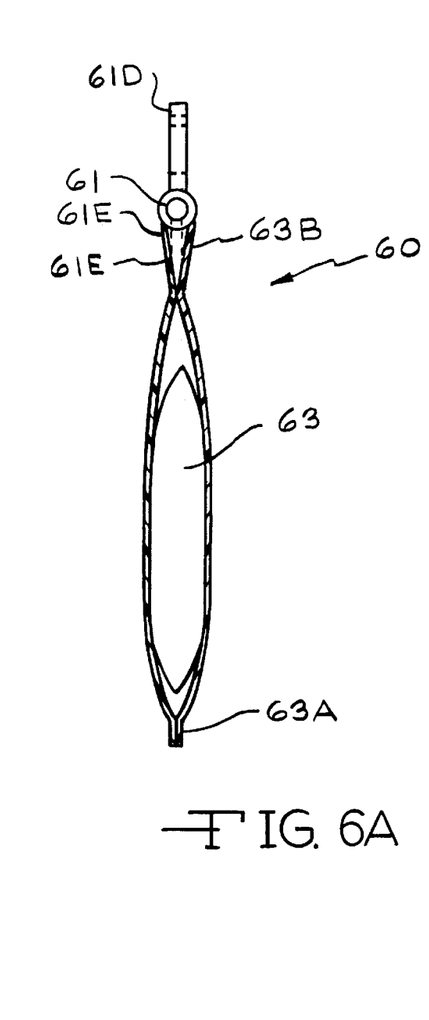
FIG. 6A is an end cross-sectional view along line 6A—6A of FIG. 6 with the pouch 63 filled.
Figure 6B:
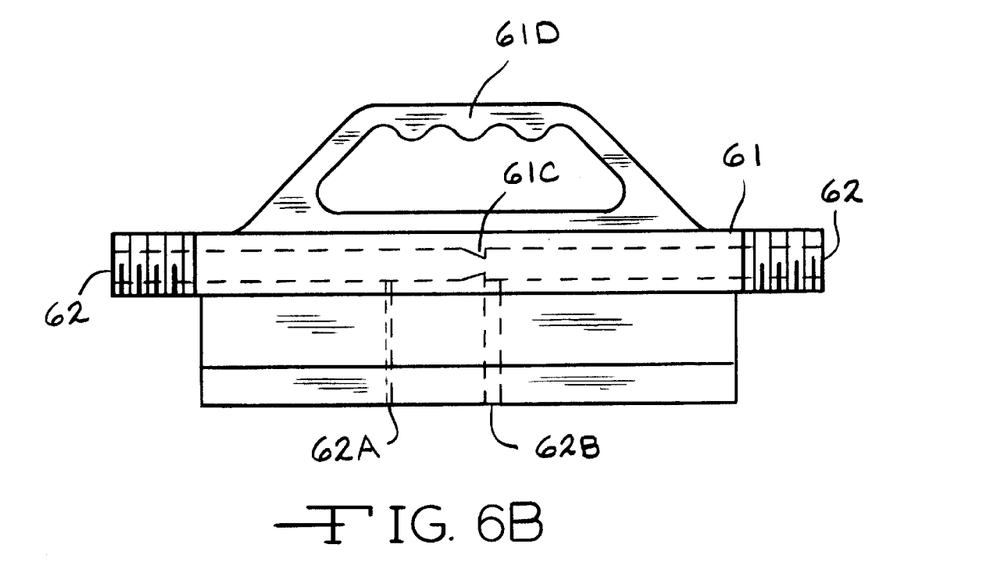
FIG. 6B is a front view of the fitment 61 alone showing opening 62 having a venturi 61C.

FIGS. 6, 6A and 6B are similar to FIG. 3. The fitment 61 is identical to that shown in FIG. 3 with openings 62, 62A and 62B, threaded ends 61A and 61B, constriction 61C, handle 61D and tapered portion 61E. Only two seals 63A and 63B are provided for a tubular pouch 63 provided by tube stock. The result is top and bottom seals 63A and 63B for container 60. The container 60 has the advantage of having a seal 63B which is wider on the outside and allows freer flow in the openings 62A and 62B.

Figure 7:
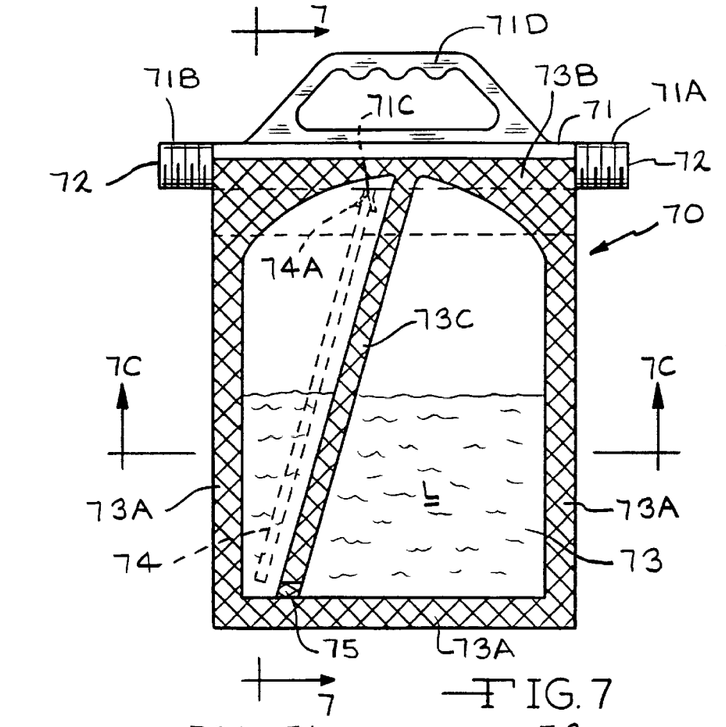
FIG. 7 is a front view of a container 70 with a fitment 71, pouch 73, a feed tube 74 and a frangible seal 75.
Figure 7A:
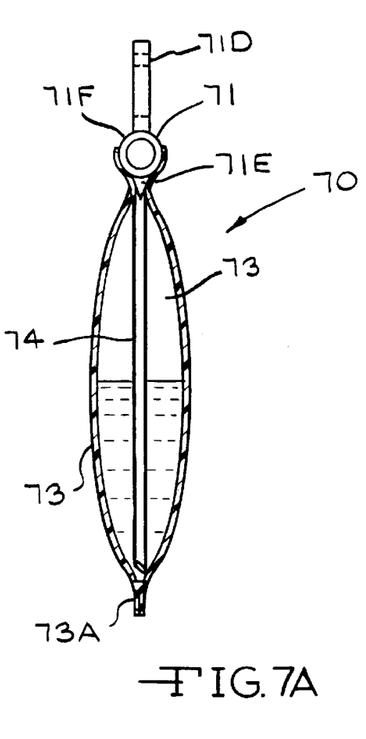
FIG. 7A is a side cross-sectional view along line 7—7 of FIG. 1.
Figure 7B:
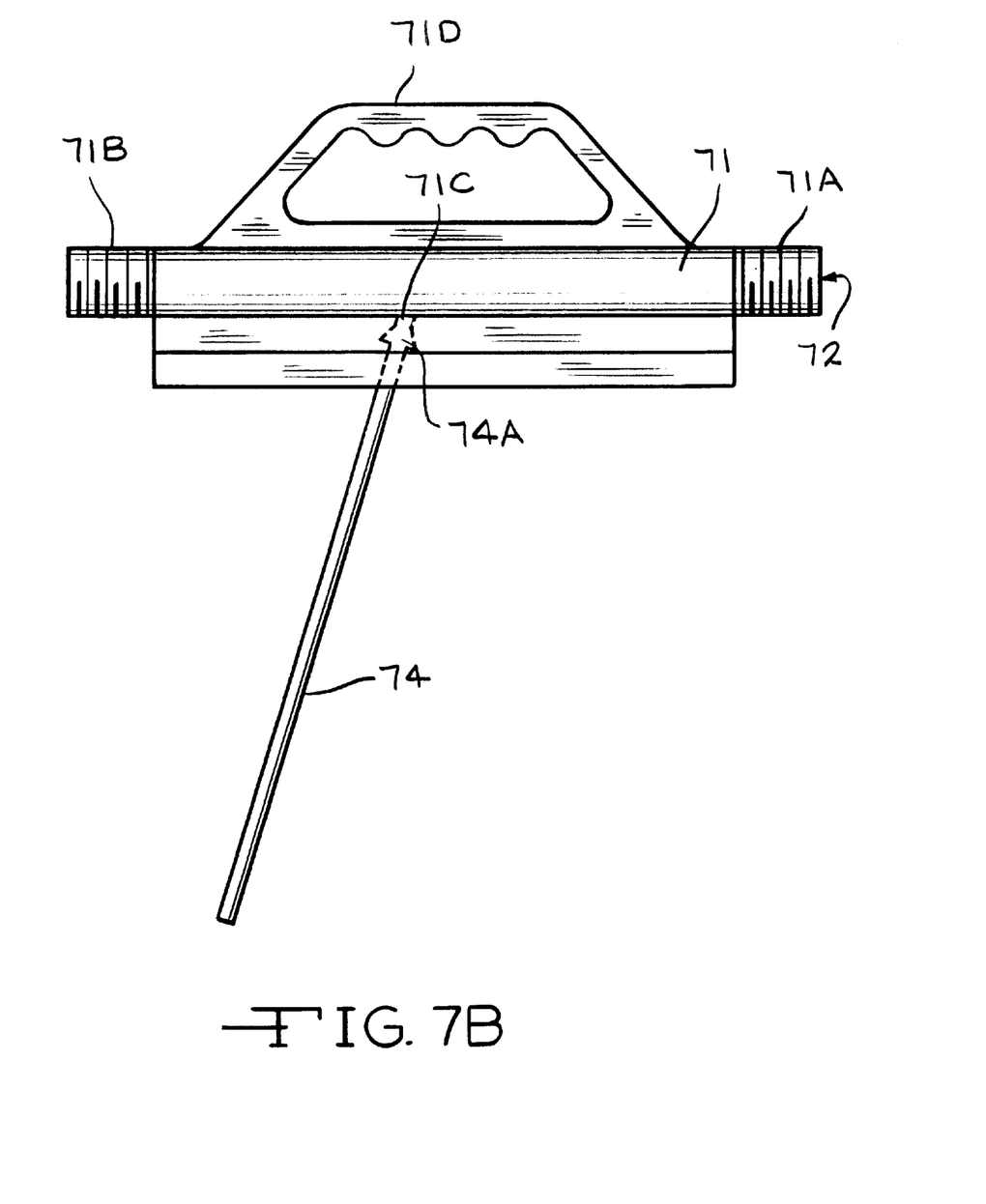
FIG. 7B is a front view of the fitment 71 and tube 74 alone.
Figure 7C:
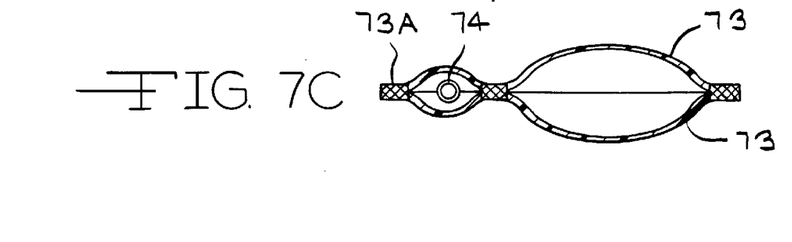
FIG. 7C is a cross-sectional view along 7C—7C of FIG. 7.

FIGS. 7, 7A and 7B is a variation of the container 60 shown in FIG. 6. Container 70 has two sections in pouch 73 includes fitment 71 with openings 72, threaded ends 71A and 71B and handle 71D. Tapers 71E are provided for sealing the pouch 73 to the fitment along with the round surface 71F of the fitment 71. The fitment has an opening 71C into which is fitted a tube 74 having a locking or bayonet end 74A. The pouch 73 is provided with a frangible seal 75 which is burst by pressing the pouch 73 or by pulling the seal apart. Seal 73A is around the pouch and seal 73B is on the fitment 71. Seal 73C forms a barrier inside the pouch 73. In use the seal 75 is ruptured. The tube 74 then aspirates the liquid L from the pouch 73 as water flows through opening 72 by aspiration. The seal 75 provides a small opening and when burst, meters the liquid L from the pouch 73.

Figure 8:
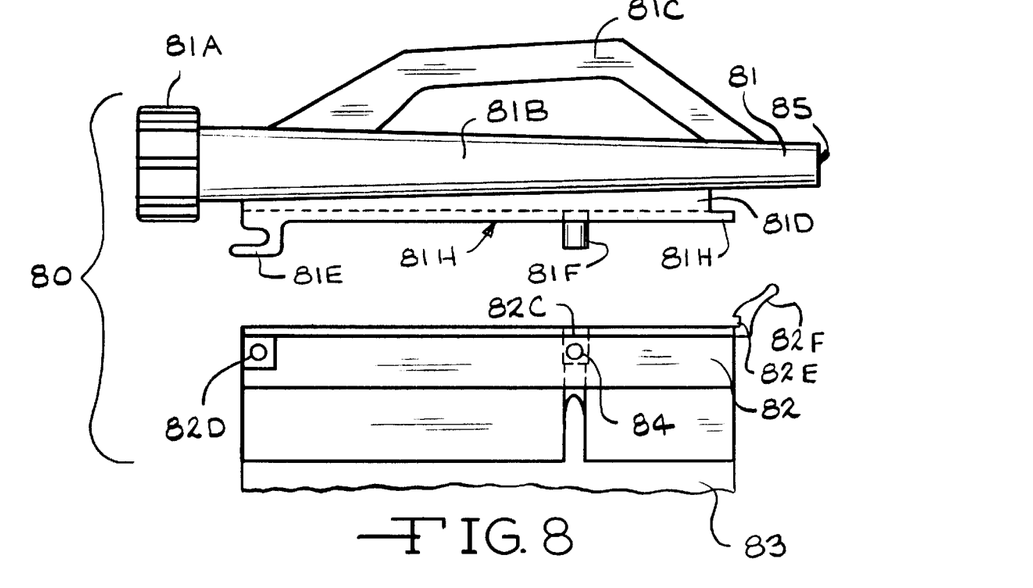
FIG. 8 is a front view of fitment parts 81 and 82 having a handle 81C for a container 80 with a pouch 83 (partial view).
Figures 8A, 8B:
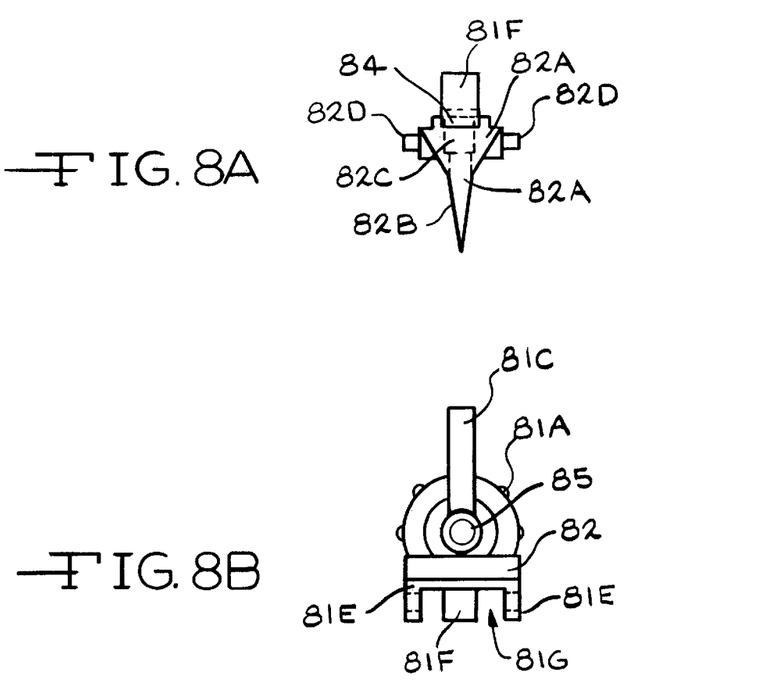
FIG. 8A is a right end view of the fitment part 82.
FIG. 8B is a right end view of the fitment part 81.

FIG. 8 shows a container 80 with a two part fitment 81 and 82 which is mounted on a pouch 83. The fitment part 81 is a nozzle for mounting on a garden or other hose or the like and includes threaded collar 81A and tubular member 81B with a handle 81C. The fitment 81 includes a base 81D with a hook 81E, a tubular projection 81F and a tab 81H. A longitudinal groove 81G is provided (dotted lines in FIG. 8). The fitment part 82 mates to the fitment part 81. The part 82 includes two tapered portions 82A and 82B, an opening 82C with a ring seal 84, lateral cylindrical projections 82D, a latch 82F with a recess 82E. The parts 81 and 82 are shown as they would be mated together as shown by the arrows in FIG. 8. The hook 81E is mounted over projections 82D and the tab 81H is snapped into latch 82F in recess 82E. The tubular projection mounts in opening 82C against seal 84 to provide a seal. Alternatively the fitment 81 can be threaded onto the fitment 82 without the use of the hook 81E, latch 82E and recess 82D (not shown). The advantage of the container 80 is that the fitment 82 and bag 83 can be disposable after use while retaining the relatively more expensive fitment part 81. The consumer thus only purchases replacement pouches 83 with fitment part 82.

As can be seen, the present invention provides a unique means of dispensing liquids or solids from a pouch. The container with the novel fitment functions to provide a very secure seal between the fitment and the pouch in an economical manner. It will be appreciated that any tubes in the pouches can have a porous ball on an end projecting into the pouch to prevent clogging.

It is intended that the foregoing description be only illustrative of the present invention and that the present invention be limited only by the hereinafter appended claims.

We claim:

1. A container comprising:
   (a) a pouch with opposed flat portions at an opening and comprised of a flexible pliable material;
   (b) a closure fitment sealingly mounted inside of the opening of the pouch on the opposed flat portions of the pouch, wherein the closure fitment has opposed elongate tapered surfaces which lead to an elongate edge with at least one opening between the tapered surfaces to the elongate edge and wherein the pouch is sealably mounted on the elongate tapered surfaces of the closure fitment, wherein the fitment provides structural stability for the pouch.

2. The container of claim 1 wherein the closure fitment has a closable spout which can be used to remove a material from the container and a cap for closing the spout.

3. The container of claim 1 wherein the pouch is heat sealed to the surfaces of the closure fitment.

4. The container of claim 1 wherein the pouch is sealed with an adhesive to the surfaces of the closure fitment.

5. The container of any one of claims 1, 2, 3 or 4 wherein the closure fitment is provided with a conduit into the pouch connected to a passage through the closure fitment which closure fitment is adapted for attachment of a source of a liquid so that a material in the pouch is introduced into the passage from the conduit by the liquid flowing through the passage.

6. The container of any one of claims 1, 2, 3 or 4 wherein the closure fitment has a conduit into the pouch connected to a passage through the closure fitment, which closure fitment is adapted for attachment to a hose so that a material in the pouch is introduced into the passage through the conduit by water from the hose flowing through the passage.

7. The container of any one of claims 1, 2, 3 or 4 wherein the closure fitment has a conduit into the pouch as a tube connected to a passage through the closure fitment, which closure fitment is adapted for attachment of a source of a liquid so that a material in the pouch is introduced into the passage from the conduit through the tube by the liquid flowing through the passage.

8. The container of any one of claims 1, 2, 3 or 4 wherein the closure fitment has a conduit into the pouch as a tube connected to the passage through the closure fitment, which closure fitment is adapted for attachment to a hose, whereby in use a material in the pouch is introduced into the passage through the tube from the hose flowing through the passage.

9. The container of claim 1 wherein the closure fitment is provided with a carrying handle.

10. The container of any one of claims 1, 2, 3 or 4 wherein the closure fitment and the pouch are composed of a plastic material.

11. The container of any one of claims 1, 2, 3 or 4 wherein a material in the pouch is aspirated into a passage in the closure fitment by a liquid flowing through the passage.

12. The container of any one of claims 1, 2, 3 or 4 wherein the pouch has a rupturable heat sealed section dividing the pouch into sections.

13. The container of claim 1 wherein the closure fitment is provided with a sprayer for a liquid in the pouch.

14. The container of any one of claims 1, 2, 3 or 4 wherein the closure fitment has a conduit into the pouch as a tube with a bayonet which is lockably inserted into a bayonet receiver in the closure fitment, the conduit being connected to a passage through the closure fitment which is adapted for attachment to a source of a liquid, whereby in use a material in the pouch is introduced into the passage through the tube by the liquid flowing through the passage.

15. A method for dispensing a material from a container which comprises:
   (a) providing a container containing the material to be dispensed comprising:
      a pouch with opposed flat portions at an opening and comprised of a flexible pliable material;
      a closure fitment sealingly mounted inside of the opening of the pouch on the opposed flat portions of the pouch, wherein the closure fitment has opposed elongate tapered surfaces which lead to an elongate edge with at least one opening between the tapered surfaces to the elongate edge and wherein the pouch is sealably mounted on the elongate tapered surfaces of the closure fitment;
   (b) opening the closure fitment into the pouch; and
   (c) dispensing the material out of the pouch and through the fitment from the container.

16. The method of claim 15 wherein the material is dispensed from the container through a closeable spout on the closure fitment.

17. The method of claim 15 wherein the closure fitment has a conduit into the pouch connected to a passage through the closure fitment which closure fitment is adapted for attachment to a source of liquid or air, wherein the material in the pouch is introduced into the passage by the liquid or air flowing through the passage, thereby dispensing the material from the container.

18. The method of claim 15 wherein the closure fitment has a conduit into the pouch connected to a passage through the closure fitment which is adapted for attachment to a hose, wherein in use the material is introduced into the passage through the conduit by water or air from the hose flowing through the passage, thereby dispensing the material from the container.

19. The method of claim 15 wherein the closure fitment has a conduit into the pouch as a tube connected to a passage through the closure fitment which is adapted for attachment of a source of a liquid, whereby in use the material in the pouch is introduced into the passage through the tube by the liquid flowing through the passage, thereby dispensing the material from the container.

20. The method of claim 15 wherein the closure fitment has a conduit into the pouch as a tube connected to the passage through the closure fitment which is adapted for attachment of a hose, whereby in use the material in the pouch is introduced into the passage through the tube by flowing from the hose flowing through the passage, thereby dispensing the material from the container.

21. A method for forming a container, comprising:

(a) providing as separate parts a pouch having sides and opposed flat portions of a sheet material, wherein the pouch is provided with an opening; and a closure fitment which has opposed elongate tapered surfaces which lead to an elongate edge with at least one opening between the tapered surfaces to the elongate edge where the pouch is sealably mounted to the closure fitment, which comprises:

(b) inserting the tapered surfaces of the closure member of the fitment on the inside of the pouch at the opening; and (c) sealing the tapered surfaces to the pouch inside the opening to form the container.

22. The method of claim 21 wherein the sealing is by heat sealing.

23. The method of claim 21 wherein the sealing is by an adhesive between the pouch and the closure fitment.

* * * * *